United States Patent
Guldi et al.

(10) Patent No.: US 11,358,205 B2
(45) Date of Patent: Jun. 14, 2022

(54) METHOD FOR PRODUCING AN OVERLAPPING CONNECTION, AND BODY COMPONENT FOR A VEHICLE

(71) Applicant: AUDI AG, Ingolstadt (DE)

(72) Inventors: Thomas Guldi, Neuenstadt (DE); Timo Englert, Langenbrettach (DE)

(73) Assignee: AUDI AG, Ingolstadt (DE)

( * ) Notice: Subject to any disclaimer, the term of this patent is extended or adjusted under 35 U.S.C. 154(b) by 120 days.

(21) Appl. No.: 16/757,599

(22) PCT Filed: Oct. 31, 2018

(86) PCT No.: PCT/EP2018/079805
§ 371 (c)(1),
(2) Date: Apr. 20, 2020

(87) PCT Pub. No.: WO2019/086508
PCT Pub. Date: May 9, 2019

(65) Prior Publication Data
US 2021/0197245 A1    Jul. 1, 2021

(30) Foreign Application Priority Data
Nov. 3, 2017   (DE) .................... 10 2017 219 534.7

(51) Int. Cl.
*B21D 39/02* (2006.01)
*B21D 31/02* (2006.01)
(Continued)

(52) U.S. Cl.
CPC .......... *B21D 39/026* (2013.01); *B21D 31/02* (2013.01); *B21D 53/88* (2013.01); *B21D 39/021* (2013.01);
(Continued)

(58) Field of Classification Search
CPC ...... B21D 39/026; B21D 31/02; B21D 53/88; B21D 39/021; B21D 39/028; B21D 22/04;
(Continued)

(56) References Cited

U.S. PATENT DOCUMENTS 3,714,688 A * 2/1973 Olson ................. B21D 39/034
29/21.1
3,909,919 A * 10/1975 Miyabayashi ....... B21D 39/021
29/521

(Continued)

FOREIGN PATENT DOCUMENTS

| CN | 1791480 A | 6/2006 |
| CN | 106270225 A | 1/2017 |

(Continued)

OTHER PUBLICATIONS

International Search Report with English translation and Written Opinion with Machine translation dated Jan. 23, 2019 in corresponding International Application No. PCT/EP2018/079805; 14 pages.

(Continued)

*Primary Examiner* — Sarang Afzali
*Assistant Examiner* — Darrell C Ford
(74) *Attorney, Agent, or Firm* — Maier & Maier, PLLC

(57) ABSTRACT

The disclosure relates to a method for producing a overlapping connection, in which at least two overlapping components are connected to one another via a folded flange, with a first edge of a first component being folded over a second edge of a second component to form the folded flange, along with a body component that includes such an overlapping connection for a vehicle and a stamping tool for such a body component. According to the disclosure at least one connection region is formed on the folded flange, in which the (Continued)

stamping tool stamps the first component through the second component at least one stamping point, with displaced material of the first component passing into the second component and producing a positive connection.

9 Claims, 3 Drawing Sheets

(51) Int. Cl.
    *F16B 11/00*     (2006.01)
    *B21D 53/88*     (2006.01)

(52) U.S. Cl.
    CPC .......... *F16B 11/006* (2013.01); *Y10T 29/4998* (2015.01); *Y10T 29/49982* (2015.01)

(58) Field of Classification Search
    CPC .... B21D 39/034; B21D 39/035; B21D 19/08; F16B 11/006; F16B 5/07; F16B 17/008; B62D 27/02
    See application file for complete search history.

(56) References Cited

U.S. PATENT DOCUMENTS

| | | | | |
|---|---|---|---|---|
| 4,176,441 A * | 12/1979 | Hafner | ................ | B21D 39/035 29/432.1 |
| 4,391,037 A * | 7/1983 | Giasini | ................ | B21C 47/247 29/21.1 |
| 4,928,388 A * | 5/1990 | Dacey, Jr. | ............ | B21D 39/021 29/21.1 |
| 5,457,981 A * | 10/1995 | Brown | ................ | B21D 39/021 29/243.58 |
| 5,718,142 A * | 2/1998 | Ferraro | ................ | B21D 39/034 29/514 |
| 5,761,948 A * | 6/1998 | Malagnoux | .......... | B21D 39/034 72/325 |
| 6,029,334 A * | 2/2000 | Hartley | ................ | B21D 39/021 29/464 |
| 6,056,099 A * | 5/2000 | Jackel | ................ | B21D 31/02 192/212 |
| 7,007,368 B2 * | 3/2006 | Sovoda | ................ | B21D 39/021 29/505 |
| 11,186,148 B2 * | 11/2021 | Gardynik | ............... | B60J 5/0413 |
| 2008/0000062 A1 * | 1/2008 | Boltz | .................. | B21D 39/034 29/243.5 |
| 2015/0001189 A1 * | 1/2015 | Spinella | ................ | B23K 35/28 219/99 |
| 2016/0009319 A1 * | 1/2016 | Langendorf | ......... | B21D 39/021 296/191 |
| 2020/0353983 A1 * | 11/2020 | Alvarez | ................ | B23K 35/24 |
| 2022/0063730 A1 * | 3/2022 | Takahashi | ............ | B62D 25/025 |

FOREIGN PATENT DOCUMENTS

| | | |
|---|---|---|
| DE | 19849676 C1 | 2/2000 |
| DE | 102009012807 A1 | 10/2009 |
| DE | 102011008174 A1 | 7/2012 |
| DE | 102013006362 A1 | 3/2014 |
| DE | 102015004496 A1 | 12/2015 |
| FR | 2985922 A1 | 7/2013 |
| JP | S55148657 A | 11/1980 |
| JP | S5680332 A | 7/1981 |
| JP | H05-58341 A | 3/1993 |
| JP | H08-13835 A | 1/1995 |
| JP | H08-103835 A | 4/1996 |
| JP | 2013046930 A | 3/2013 |

OTHER PUBLICATIONS

Chinese Office Action dated Apr. 8, 2021, in connection with corresponding CN Application No. 201880070812.X (16 pp., including machine-generated English translation).

Notification of Transmittal of Translation of the International Preliminary Report on Patentability dated May 14, 2020, in connection with corresponding international Application No. PCT/EP2018/079805 (7 pgs.).

* cited by examiner

METHOD FOR PRODUCING AN OVERLAPPING CONNECTION, AND BODY COMPONENT FOR A VEHICLE

FIELD

The disclosure relates to a method for producing an overlapping connection. The disclosure further relates to a body component for a vehicle, and to a stamping tool.

BACKGROUND

Numerous variations of methods for producing overlapping connections in which at least two overlapping components are connected to one another by means of a folded flange are known. To form the folded flange, a first edge of a first component can be folded over a second edge of a second component.

Also known are numerous variations of body components for vehicles that comprise at least two components connected to one another via an overlapping connection that has at least one folded flange. The folded flange comprises a first edge of a first component, which is folded over a second edge of a second component.

DE 10 2013 006 362 A1 discloses a method for producing a body component of this type, in particular a vehicle door. In the described method, an adhesive is applied to a fold region between an inner body part and an outer paneling part, and an edge region of the outer paneling part is then folded over a corresponding edge region of the inner body part. Before the adhesive is applied, at least one raised area is formed at the edge region of the inner body part. This raised area can be stamped into the inner body part using a stamping tool.

Known from DE 10 2015 004 496 A1 is a method for producing an overlapping connection in which at least two partially overlapping metal components are welded to one another by laser welding, with a pulsed laser beam being generated by means of the laser and the components being joined by means of several welding spots. The respective welding times per welding spot in this method are greater than 1 μs and less than 1 ms. Prior to welding, one component can be folded over the other component.

SUMMARY

One disadvantage of such methods and body components is the fact that a folded flange created by folding a first edge of a first component over a second edge of a second component cannot reliably prevent movements of the components relative to one another.

The object of the invention is to provide a method for producing an overlapping connection that reduces relative movements between the components that are connected to one another by the overlapping connection.

A further object of the invention is to provide a body component of high, reproducible component quality, having at least two components that are connected to one another by an overlapping connection, along with a stamping tool for stamping such a body component.

To provide a method for producing a overlapping connection that reduces relative movements between the components that are connected to one another by the overlapping connection, at least one connection region is formed on the folded flange, in which region an stamping tool embosses the first component through the second component at at least one stamping point, with displaced material of the first component passing into the second component and producing a positive connection.

To provide a body component of high, reproducible component quality that comprises at least two components connected to one another by an overlapping connection, a folded flange of the overlapping connection comprises at least one connection region, in which a first component is stamped through a second component at at least one stamping point, with displaced material of the first component passing into the second component and producing a positive connection.

To provide a stamping tool for stamping such a body component, the stamping tool has a stripper and at least one support which is arranged so as to be movable relative to the stripper and on which a single tip or a double tip is arranged.

In the following, an overlapping connection is understood as a connection in which at least two overlapping components are connected to one another at least via a folded flange. The folded flange is understood in the following as a non-positive connection between at least two components, in which a first edge of a first component is folded over a second edge of a second component. The second edge of the second component is thereby enveloped at least partially by the first edge of the first component.

In the following, the connection region is understood as at least one region of the folded flange in which the stamping at at least one stamping point creates an additional positive connection between the at least two components. In this process, a stamping tool can pierce from the outside through the folded flange and stamp the first component through the second component.

The body component is understood in the following as an assembly that has at least two components connected to one another by the overlapping connection.

In the following, a relative movement can be understood as a dissetting of one of the two components relative to the other component after folding. After the folding step, this relative movement can be caused by various external influences during assembly, such as the handling of the body component by an industrial robot, by vibrations during transport outside of the assembly site, by thermal expansion in a furnace, or by manual handling during attachment of the component to a vehicle body.

Advantageously, the folding and stamping can be used to implement a simple, cost-effective combination of connections consisting of the non-positive connection of the folded flange and the positive connection produced by the stamping. No additional connecting elements such as rivets, holes, etc. in either of the two components are required, and therefore, an additional coordination requirement during assembly can advantageously be avoided. In addition, the stamping advantageously allows a complex, expensive welding process to be dispensed with. Since the stamping takes place only after the folding, it can be ensured that the two components are connected to one another in a positive connection by means of the stamping, thereby advantageously impeding or completely preventing a dissetting of the components relative to one another. This enables the connected components to be transported or enables the connected components to be further processed immediately after folding and stamping. Moreover, the stamping can be used on steel components and aluminum, which are frequently used in vehicle manufacturing. The dimensions of the single tip or the double tip of the stamping tool are selected such that the second component is not penetrated completely during the stamping process. In this way, the formation of bulges on a bottom surface of the first component, which may be a visible surface, can advantageously be prevented.

Body components that have a folded flange with at least one additional connection region advantageously have no or only minor relative movements between the components that are connected to one another in this way. This advantageously enables a consistent body component quality and allows fluctuations in the process chain to be reduced.

In an advantageous embodiment of the method according to the invention, a single tip of the stamping tool can stamp at least two stamping points in succession into the first component in the at least one connection region of the folded flange. The two stamping points, which are preferably set in close proximity to one another, advantageously increase torsion resistance and spot strength in the corresponding connection region.

In an alternative embodiment of the method according o the invention, a double tip of the stamping tool can stamp two adjacent stamping points simultaneously into the first component in the at least one connection region of the folded flange. The simultaneous setting of two stamping points advantageously enables the assembly time to be reduced. In addition, the two stamping points advantageously increase torsion resistance and spot strength in the corresponding connection region.

In a further advantageous embodiment of the method according to the invention, a plurality of connection regions can be formed at a predefined distance from one another on the folded flange. The distance between the connection regions can be adapted, for example, to the dimensions of the components being connected to one another or to the dimensions of the folded flange.

In a further advantageous embodiment of the method according to the invention, an adhesive can be applied between the first edge of the first component and the second edge of the second component prior to folding, forming an adhesive bond between the two components. This adhesive bond advantageously further improves the stability and the strength. of the overlapping connection. In addition, the adhesive is able to cure without relative movement occurring between the first component and the second component, since these are adequately fixed by the positive connection produced by stamping until the adhesive has cured. A curing process performed in an oven can thereby advantageously be at least reduced or even completely eliminated, or an extended waiting time for curing can be dispensed with, allowing the component combination to be further processed immediately.

In an advantageous embodiment of the body component according to the invention, the body component can be configured as a vehicle door. The vehicle door may correspond to a hood, a side door, and/or a trunk lid.

In a further advantageous embodiment of the body component according to the invention, the first component may be configured as an exterior panel and the second component as an interior panel. In addition, the first component and the second component may be embodied at least partially as steel and/or aluminum components. The two components can be reliably connected to one another via the folded flange with the connection regions.

The advantages and preferred embodiments described for the method according to the invention also apply to the body component according to the invention.

The features and feature combinations mentioned above in the description along with the features and feature combinations mentioned in the following description of the figures and/or merely shown in the figures can be used not only in the specified combination but also in other combinations or alone, without thereby departing from the scope of the invention. Thus, embodiments that are not explicitly depicted or explained in the figures but that emerge from the embodiments described by separate feature combinations and that can be produced are also to be regarded as disclosed and as covered by the invention.

BRIEF DESCRIPTION OF THE DRAWINGS

Exemplary embodiments of the invention are depicted in the set of drawings and will be explained in greater detail in the following description. In the drawings, the same reference signs denote components or elements that perform the same or similar functions. The drawings show.

DETAILED DESCRIPTION

Figure 1:
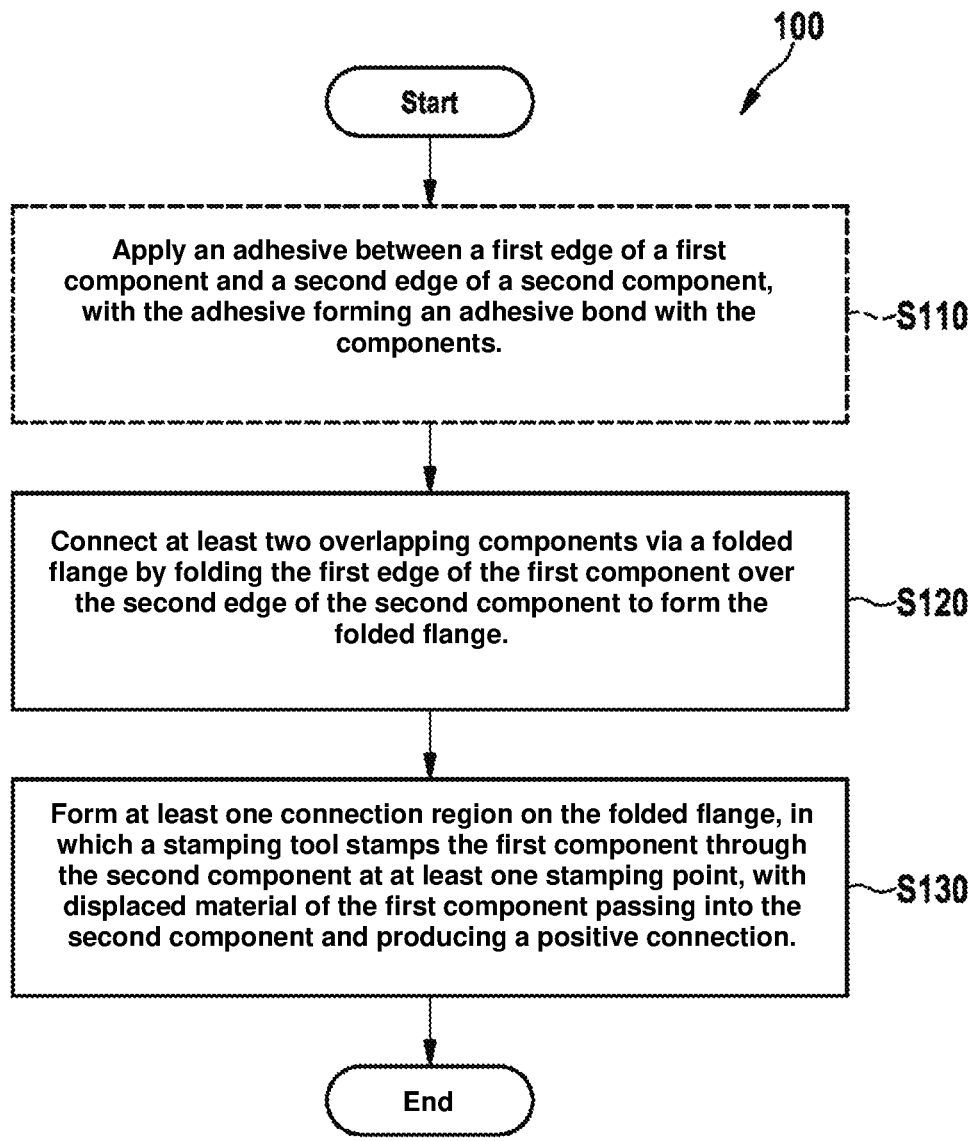
FIG. 1 a schematic block diagram of a method according to the invention for producing an overlapping connection, and FIG. 2 a schematic sectional view of a detail of a body component according to the invention during a stamping process in which a first exemplary embodiment of a stamping tool according to the invention is used.

As is clear from FIG. 1, in the depicted exemplary embodiment of a method 100 according to the invention for producing an overlapping connection 2, in a method step S120, at least two overlapping components 10, 20 are connected to one another by means of a folded flange 30. In this step, a first edge 11 of a first component 10 is folded over a second edge 22 of a second component 20 to form the folded flange 30.

According to the invention, in a method step S130 at least one connection region 32 is formed on the folded flange 30, in which a stamping tool 40 stamps the first component 10 through the second component 20 at at least one stamping point 34, with displaced material of the first component 10 passing into the second component 20 and producing a positive connection.

Figure 2:
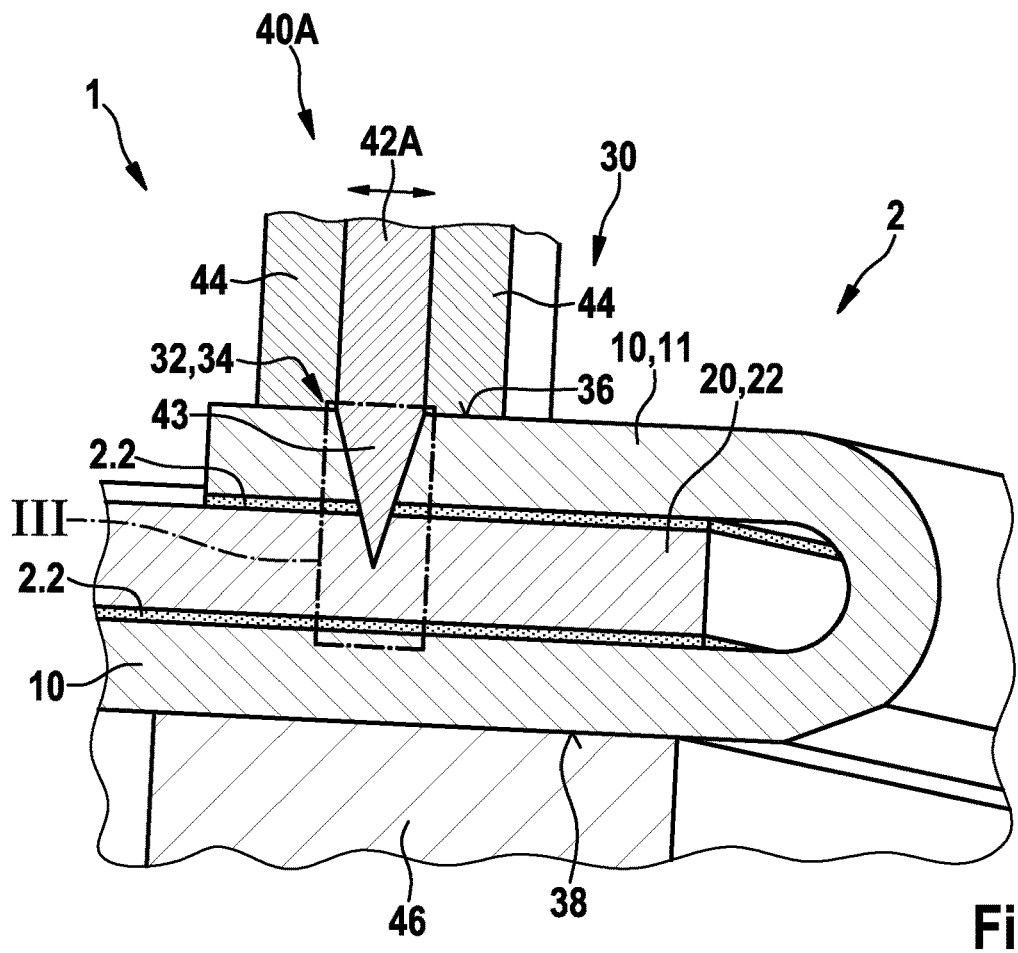
Figure 3:
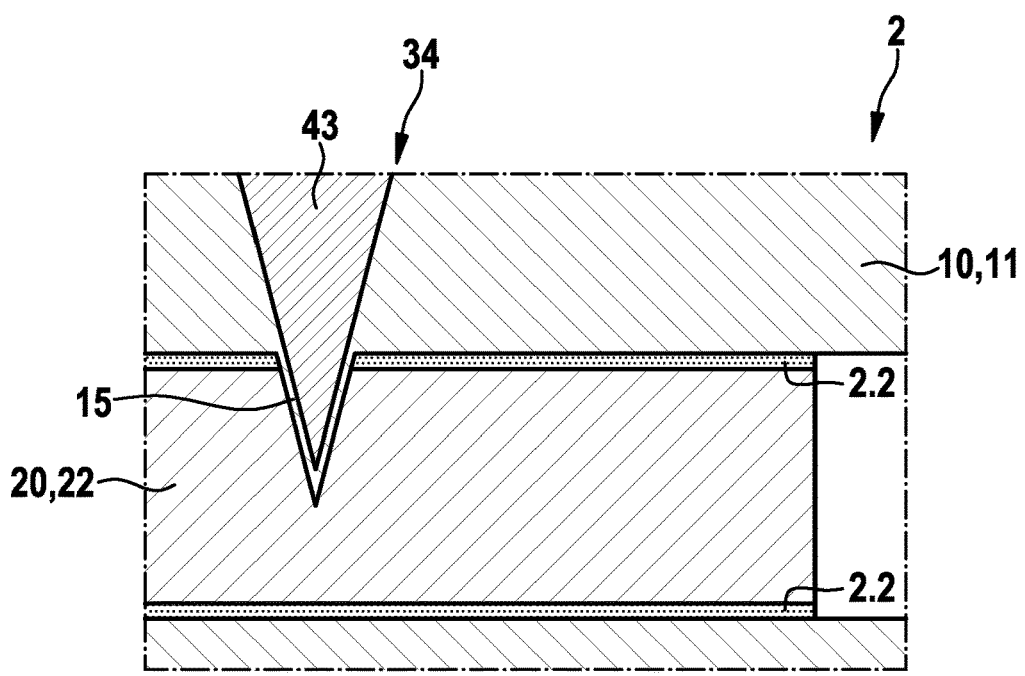
FIG. 3 a schematic detailed view of a stamping point from FIG. 2.
Figure 4:
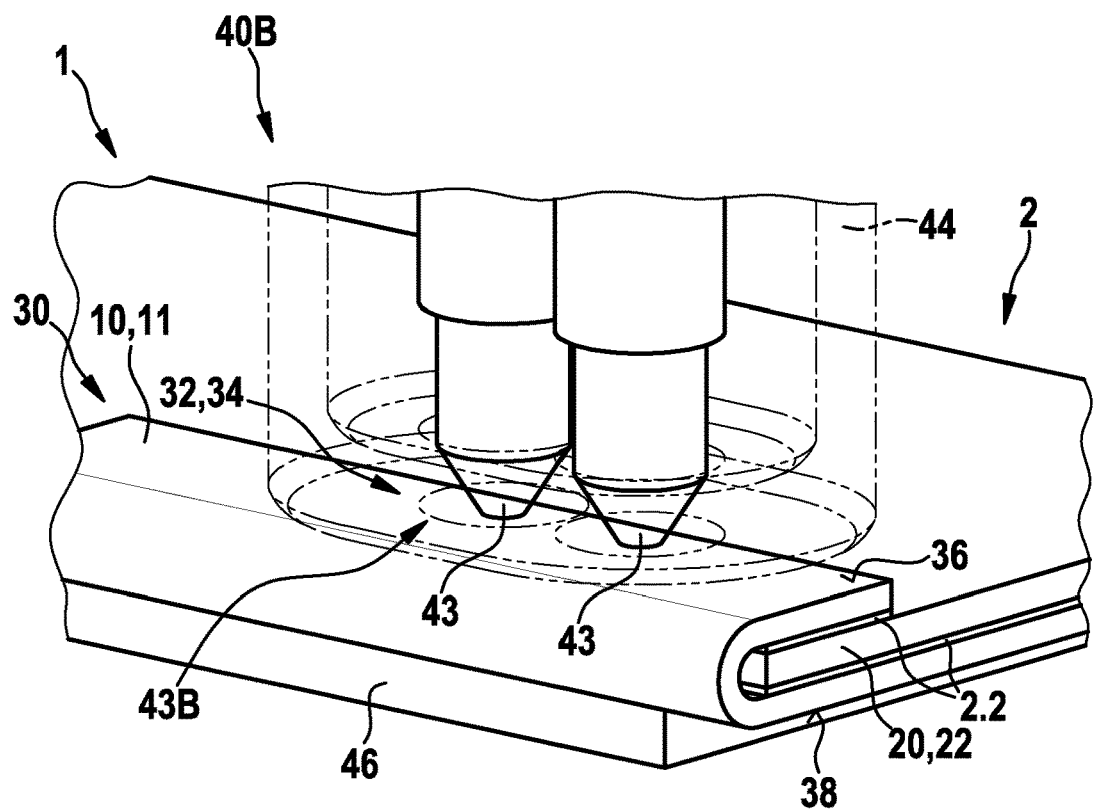
FIG. 4 a schematic sectional view of a detail of a body component according to the invention during a stamping process in which a second exemplary embodiment of a stamping tool according to the invention is used, FIG. 5 a schematic sectional view of a detail of the stamping tool according to the invention from FIG. 4.

As is further clear from FIGS. 2 to 4, the depicted exemplary embodiments of a body component 1 for a vehicle according to the invention each have at least two components 10, 20 in the detail shown, which are connected to one another via a overlapping connection 2 having at least one folded flange 30, in which a first edge 11 of a first component 10 is folded over a second edge 22 of a second component 20.

According to the invention, the folded flange 30 of the overlapping connection 2 of the body component 1 according to the invention comprises at least one connection region 32, in which the first component 10 is stamped through the second component 20 at at least one stamping point 34, with displaced material 15 of the first component 10 passing into the second component 20 and producing a positive connection.

In an alternative exemplary embodiment of the body component 1 according to the invention (not shown), the first edge 11 of the first component 10 can be folded over more than one second component 20. This enables three components, for example, to be connected to one another by means of an overlapping connection 2 according to the invention to form a body component 1.

Figure 5:
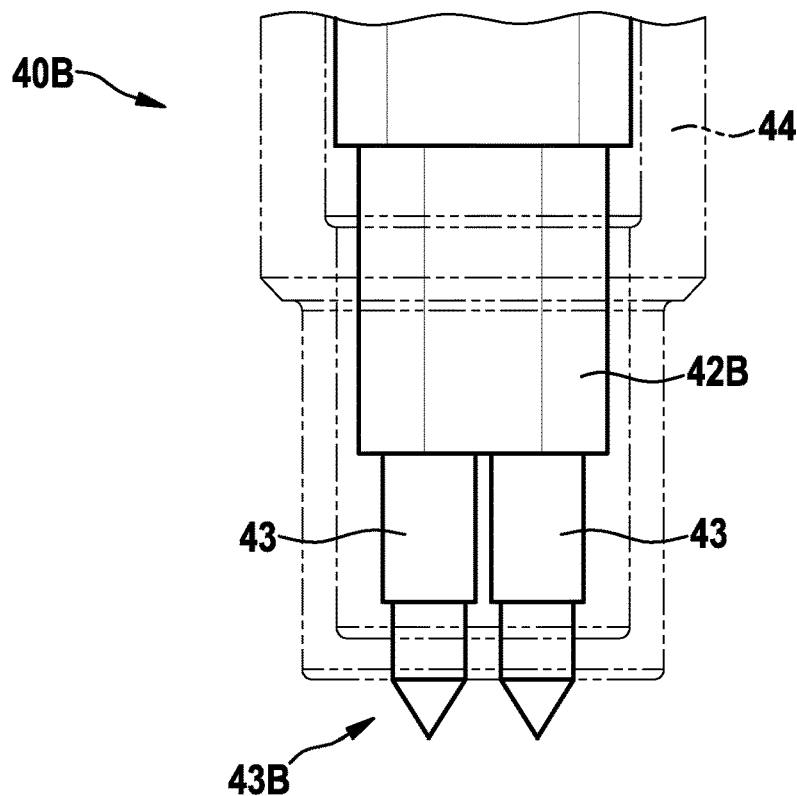

As is further clear from FIGS. 2 and 3, the first stamping tool 40A used for the method 100 according to the invention in the first exemplary embodiment shown has a bearer 42A, which is guided in a stripper 44 and on which a single tip 43 is arranged. As is further clear from FIGS. 4 and 5, in an alternative second exemplary embodiment the stamping tool 40B has a bearer 42B which is guided in a stripper 44 and on which a double tip 43B, which comprises two single tips, is arranged. The stripper 44 enables the first component 10 and the second component 20 to be detached from the single tip 43 or the double tip 43B of the stamping tool 40A, 40B after stamping. This allows additional lubrication in the case of unwashed components 10, 20 to be dispensed with. In addition, each of the depicted stamping tools 40A, 40B has a counter bearing 46. The folded flange 30 rests its a bottom surface 38 on the counter bearing 46. A top surface 36 of the folded flange 30 faces the single tip 43 or the double tip 43B. The top surface 36 and the bottom surface 38 of the folded flange 30 are formed by the first edge 11 of the first component 10, which envelops the second edge 22 of the second component 20. The single tip 43 or the double tip 43B of the stamping tools 40A, 40B stamps from the top through the first component 10 and into the second component 20 without passing all the way through the second component 20.

In an alternative embodiment of the method 100 according to the invention, the stamping tools 40A, 40B can also have more than two individual tips 43. Additionally, the stamping tools 40A, 40B can each have a C-clamp, which can be manipulated by an industrial robot. This enables many stamping points 34 to be introduced into the body component 1 according to the invention flexibly and using only one stamping tool 40A, 40B.

In the depicted exemplary embodiment of the method according to the invention, the stamping tool 40A uses the single tip 43 to set one or more stamping points 34 in succession into the connection region 32. In a preferred exemplary embodiment of the method 100 according to the invention, the single tip 43 of the stamping tool 40A sets two stamping points 34 in succession in the at least one connection region 32 of the folded flange 30.

In an alternative exemplary embodiment of the method 100 according to the invention, the stamping tool 40B with the double tip 43B that is used sets two adjacent stamping points 34 simultaneously in the at least one connection region 32. In this case, the double tip 43B can set two stamping points 34 multiple times inn a connection region 32, so that the connection region 32 can have a multiple of two stamping points.

In the method 100 according to the invention, a plurality of connection regions 32 are formed on the folded flange 30 at a predefined distance from one another. The number and the spacing of the connection regions 32 are selected based upon the dimensions of the folded flange 30.

As is further clear from FIG. 1, in the depicted exemplary embodiment of the method 100 according to the invention an adhesive 2.2 is applied between the first edge 11 of the first component 10 and the second edge 22 of the second component 20 prior to folding, thereby forming an adhesive bond.

As is further clear from FIGS. 2 to 4, the first edge 11 of the first component 10 envelops the second edge 22 of the second component 20 in each of the depicted exemplary embodiments of the body component 1 according to the invention. The connection region 32 depicted in FIGS. 2 and 3 has one stamping point 34, and the connection region 32 depicted in FIG. 4 has two stamping points 34. In an alternative exemplary embodiment of the body component 1 according to the invention (not shown), the connection region 32 may have more than two stamping points 34. Additionally, in the depicted exemplary embodiments of the body component 1 according to the invention, an adhesive 2.2 is placed between the first edge 11 of the first component 10 and the second edge 22 of the second component 20. The folded flange 30 may be arranged around the entire periphery of the body component 1 according to the invention, forming a rounded end region of the body component 1 according to the invention. In that case, the connection regions 32 can be positioned at a predefined distance from one another on the folded flange 30. Alternatively, the folded flange 30 may be arranged only in certain areas of the body component 1 according to the invention. In that case, the body component 1 according to the invention may be embodied as a vehicle door or as some other suitable body component 1.

In each of the depicted exemplary embodiments of the body component 1, the first component 10 is embodied as an exterior panel and the second component 20 is embodied as an interior panel. In addition, the first component 10 and the second component 20 can be embodied at least partially as steel and/or aluminum components. Components with a high aluminum content are used if the body component 1 according to the invention is required to be lightweight. Components with a high steel content are used in areas where the body component 1 according to the invention requires a high degree of stability or rigidity.

The method 100 according to the invention for producing an overlapping connection 2 creates an overlapping connection 2 that permits little or no relative movement between the connected components 10, 20. Body components 1 having a plurality of components 10, 20 that are connected to one another by such an overlapping connection 2 are highly reproducible since the relative movements between the components 10, 20 are prevented or at least impeded.

The invention claimed is:

1. A method comprising:
    folding a first edge of a first component over a second edge of a second component to form a folded flange;
    forming at least one connection region on the folded flange;
    stamping, with a stamping tool, the first component through the second component simultaneously at two adjacent stamping points, wherein displaced material of the first component passes into the second component and produces a positive connection.

2. The method according to claim 1, wherein a double tip of the stamping tool stamps the two adjacent stamping points simultaneously into the first component in the at least one connection region of the folded flange.

3. The method according to claim 2, wherein a plurality of connection regions are formed at a predefined distance from one another on the folded flange.

4. The method according to claim 2, further comprising:
    applying an adhesive between the first edge of the first component and the second edge of the second component to form an adhesive bond.

5. The method according to claim 1, wherein a plurality of connection regions are formed at a predefined distance from one another on the folded flange.

6. The method according to claim 5, further comprising:
applying an adhesive between the first edge of the first component and the second edge of the second component to form an adhesive bond.

7. The method according to claim 1, further comprising:
applying an adhesive between the first edge of the first component and the second edge of the second component to form an adhesive bond.

8. The method according to claim 1, wherein a plurality of connection regions are formed at a predefined distance from one another on the folded flange.

9. The method according to claim 1, further comprising:
applying an adhesive between the first edge of the first component and the second edge of the second component to form an adhesive bond.

\* \* \* \* \*